United States Patent
Zhu et al.

(10) Patent No.: US 10,420,327 B2
(45) Date of Patent: *Sep. 24, 2019

(54) PET TRACTOR

(71) Applicant: Suzhou Petmate Industry & Trade Co., Ltd., Suzhou (CN)

(72) Inventors: Haiyuan Zhu, Suzhou (CN); Xinggen Huang, Suzhou (CN)

(73) Assignee: SUZHOU PETMATE INDUSTRY & TRADE CO., LTD., Suzhou (CN)

( * ) Notice: Subject to any disclaimer, the term of this patent is extended or adjusted under 35 U.S.C. 154(b) by 185 days.

This patent is subject to a terminal disclaimer.

(21) Appl. No.: 15/590,083

(22) Filed: May 9, 2017

(65) Prior Publication Data

US 2017/0339923 A1    Nov. 30, 2017

(30) Foreign Application Priority Data

May 24, 2016 (CN) .......................... 2016 1 0347931

(51) Int. Cl.
*A01K 27/00* (2006.01)
*B65H 75/44* (2006.01)
*B65H 75/34* (2006.01)

(52) U.S. Cl.
CPC ....... *A01K 27/004* (2013.01); *B65H 75/4431* (2013.01); *A01K 27/003* (2013.01); *B65H 75/34* (2013.01)

(58) Field of Classification Search
CPC ............................ A01K 27/003; A01K 27/004
USPC .......................................... 119/774, 795–798
See application file for complete search history.

(56) References Cited

U.S. PATENT DOCUMENTS

| | | | | |
|---|---|---|---|---|
| 5,377,626 A * | 1/1995 | Kilsby | ............... | A01K 27/004 119/796 |
| 6,148,773 A * | 11/2000 | Bogdahn | ............... | A01K 27/004 119/794 |
| 6,405,683 B1 * | 6/2002 | Walter | ............... | A01K 27/004 119/772 |
| 7,866,282 B2 * | 1/2011 | Simpson | ............... | A01K 27/004 119/781 |
| 8,256,385 B2 * | 9/2012 | Goldenberg | ....... | B65H 75/4431 119/796 |
| 9,814,217 B2 * | 11/2017 | Zhu | ..................... | A01K 27/004 |
| 2006/0266300 A1 * | 11/2006 | Perkitny | ............... | A01K 27/004 119/713 |

(Continued)

FOREIGN PATENT DOCUMENTS

| | | |
|---|---|---|
| CN | 104026039 A | 9/2014 |
| CN | 104351077 A | 2/2015 |
| CN | 205902630 U | 1/2017 |

*Primary Examiner* — David J Parsley
(74) *Attorney, Agent, or Firm* — SZDC Law PC (57) ABSTRACT

A pet tractor includes a housing with a handle formed thereon; a turntable rotatably disposed in the housing; a hauling rope coiled on the turntable, with the housing provided with a rope hole for drawing out the hauling rope, the handle being provided with a button partially exposed out of the housing; a guide sleeve, fixed in the housing, provided inside with a guide hole extending along the radial direction of the turntable; a tab, in linkage with the button, slidably arranged in the guide hole of the guide sleeve, with a return spring connected between the tab and the guide sleeve; and a plurality of circumferentially spaced teeth, engaging with the tab, are formed circumferentially around the turntable.

8 Claims, 7 Drawing Sheets

(56) References Cited

U.S. PATENT DOCUMENTS

| | | | |
|---|---|---|---|
| 2008/0230015 A1* | 9/2008 | Bleshoy | A01K 27/004 119/796 |
| 2013/0008392 A1* | 1/2013 | Holmstrom | A01K 27/004 119/796 |
| 2013/0167781 A1* | 7/2013 | Marshall | A01K 27/004 119/794 |
| 2015/0075447 A1* | 3/2015 | Chefetz | A01K 27/004 119/796 |
| 2015/0128879 A1* | 5/2015 | Anderson | A01K 27/004 119/796 |

* cited by examiner

PET TRACTOR

This application claims priority to Chinese Patent Application No. 201610347931.8, Filed on May 24, 2016, which is incorporated by reference for all purposes as if fully set forth herein.

FIELD OF THE INVENTION

The present invention relates to the field of pet care products, specifically to a pet tractor.

BACKGROUND OF THE INVENTION

In order to prevent a pet from straying, it is often equipped with a tractor. Currently, the pet tractors available on the market, having a variety of structures, generally include a housing, a turntable disposed in the housing, and a hauling rope coiled on the turntable, with a revolving body disposed between the housing and the turntable for retracting the hauling rope automatically.

This traditional pet tractor has the following disadvantages:
1) When the pet suddenly runs away for being frightened or ready to attack others, the hauling rope coiled on the spool will be pulled out quickly, and the host cannot brake the turntable in the tractor in time to stop the pet, which is easy to cause an accident.
2) Even if a button is provided on some tractors to brake the turntable, when the turntable of this tractor is braked to be locked, the traction of the pet towards the hauling rope may result in impact on the turntable and button, which is very easy to cause impact damage on the button and lead to locking failure.
3) The usual button on the tractor has only two states including locked and unlocked states, which cannot meet the need of "snubbing" in the process of traction of the pet.
4) It is inconvenient for the turntable to make the brake action and achieve the locked state.

SUMMARY OF THE INVENTION

In order to solve the above problems, a purpose of the present invention is to provide a pet tractor, which allows a user to quickly brake the turntable in the tractor simply by lightly pressing the button on this tractor.

A technical solution of the present invention is as follows: A pet tractor is provided, comprising a housing with a handle formed thereon, a turntable rotatably disposed in the housing, and a hauling rope coiled on the turntable, with the housing provided with a rope hole for leading out the hauling rope; the handle is provided with a button partially exposed out of the housing; a guide sleeve, fixed in the housing, is provided inside with a guide hole extending along the radial direction of the turntable; a tab, in linkage with the button, is slidably arranged in the guide hole of the guide sleeve, with a return spring connected between the tab and the guide sleeve; a plurality of circumferentially spaced teeth, engaging with the tab, are formed circumferentially around the turntable; in a natural state, under the action of the elastic force of the return spring, the tab is separated from the teeth, and the turntable can rotate freely; after the button is pressed, the tab makes a linkage action to move inwardly along the radial direction of the turntable and engages with the teeth, and the turntable is tightly locked circumferentially.

Based on the above technical solution, the present invention further provides the following preferred solution:

The teeth are distributed symmetrically on both sides of the turntable in the axial direction; the tab has an inner end near the turntable and an outer end away from the turntable, with the tab provided at the inner end with two pallets that are spaced in parallel with each other and respectively correspond to the teeth on both sides of the turntable in the axial direction.

With a spring seat fixed in the guide sleeve, the tab is movably sleeved outside the spring seat and is slidable along the guide hole of the guide sleeve, and the return spring is fixed at one end to the spring seat and connected at the other end against the tab.

The guide sleeve comprises a left sleeve casing and a right sleeve casing that snap fit with each other, on whose snap-fitting surfaces are respectively formed two sockets extending inwardly; and two pins, formed respectively at the left and right ends of the spring seat, are inserted into the sockets.

The button includes a button body partially exposed out of the housing, the button body being provided at the rear portion with a hinged end hinged in the housing and at the front portion with a drive end abutting against the outer end of the tab.

The rope hole is provided with a rubber collar.

The button body is provided with a limit pusher that can move back and forth and is located inside the housing, and a push button that is fixed on this limit pusher and located outside the housing, a limit rib in cooperation with the limit pusher being also formed inside the housing.

The housing is composed of a left half housing and a right half housing that snap fit with each other.

The teeth have a tooth tip portion at the top and a curved guide slope extending downward from this tooth tip portion.

The present invention has the following advantages:
1. In the process of using this pet tractor of the present invention, a user can lock the turntable in the tractor circumferentially to prevent the hauling rope from being pulled out simply by pressing the button on the tractor, thereby effectively limiting the pet's running.
2. The design of the curved guide slope on the teeth not only increases the structural strength of the teeth, but also reduces the contact area of the teeth with the tab, which is more conducive to engagement of the tab with the teeth, prevents the tab from being opposite to the teeth "tip to tip" to the maximum extent, avoids the situation that the locking button cannot be pressed to get locked, and prevents the locking button from being attacked to get damaged while being locked. The rotational cutting-in of the tab and the guiding of the curved slope of the teeth guarantee that the tab can cut in to brake in time, avoiding to the maximum extent the situation that the tab and the teeth cannot cut in to lock due to the tab being opposite to the teeth "tip to tip".
3. The user can brake the turntable simply by pressing the button, disenabling the hauling rope to be pulled out; after the button is released, under the action of the return spring, the tab and the button return immediately (with the push button not locked), and the turntable is unlocked again immediately, thereby "snubbing" the turntable; when the button is pressed to push the push button again to get the button locked in the pressed-down position, even if the button is released, the turntable is still kept in the brake state, not requiring the user to keep pressing upon the button, with the button and the push button operated simply by the same finger, which is very convenient.

4. The button and the tab, having a split structure, get the turntable locked depending on engagement of the tab with the teeth; when the turntable is locked, no matter how the pet pulls the hauling rope, the impact force of the hauling rope to the turntable will be delivered only to the tab, and then to the housing from the tab, resulting in no impact on the button, thus extending the service life of the button.

5. The guide sleeve is designed into a split structure comprising a left sleeve casing and a right sleeve casing that snap fit with each other, on whose snap-fitting surfaces are respectively formed two sockets extending inwardly; and two pins, formed respectively at the left and right ends of the spring seat, are inserted into the sockets, that is, the spring seat is fixed in the guide sleeve through a total of four pins on its left and right sides. Not only does this design facilitate the assembly of the guide sleeve, the spring, the spring seat and the tab, but also the spring seat has a guide positioning effect on the snap fitting of the left sleeve casing with the right sleeve casing, which is very ingenious.

BRIEF DESCRIPTION OF THE DRAWINGS

The present invention will be further described below with reference to drawings and examples.

List of reference numbers: 1. A housing; 1a. a handle; 1b. a rope hole; 1c. a limit rib; 1. a housing; 2. a turntable; 3. a hauling rope; 4. a guide sleeve; 4a. a spring seat; 5. a button; 5a. a button body; 5b. a hinged end; 5c. a drive end; 5d. a push button; 5e. a limit pusher; 6. a rubber collar; 7. a tab; 7a. a pallet; and 8. a return spring.

DETAILED DESCRIPTION OF THE PREFERRED EMBODIMENT

FIGS. 1-7 show a specific example of this pet tractor of the present invention, which comprises a housing 1, a turntable 2 rotatably disposed in the housing 1, and a hauling rope 3 coiled on the turntable 2. The housing 1 is composed of a left half housing and a right half housing that snap fit with each other; the housing 1 is provided with a handle 1a and a rope hole 1b, the hauling rope 3 leading out from the rope hole 1b, the handle 1a being convenient for a user to hold.

The key improvement of the present invention is that the handle 1a is provided with a button 5 exposed out of the housing 1. A guide sleeve 4, fixed in the housing 1, is provided inside with a guide hole extending along the radial direction of the turntable 2; a tab 7, in linkage with the button 5, is slidably arranged in the guide hole of the guide sleeve 4, with a return spring 8 connected between the tab 7 and the guide sleeve 4. A plurality of circumferentially spaced teeth 2a, engaging with the tab 7, are formed circumferentially around the turntable 2. In a natural state, under the action of the elastic force of the return spring 8, the tab 7 is in a first work position, in which the tab 7 is separated from the teeth 2a and the turntable 2 can rotate freely. After the button 5 is pressed, the tab 7 makes a linkage action to be placed in a second work position, in which the tab 7 moves inwardly along the radial direction of the turntable 2 and engages with the teeth 2a, and the turntable 2 is tightly locked circumferentially.

When the pet runs away, the button 5 is pressed, such that the tab 7 engages with the teeth 2a, the turntable 2 is locked circumferentially and not able to rotate, and the guide rope 3 cannot be pulled out, thereby effectively limiting the pet's running.

Figure 7:
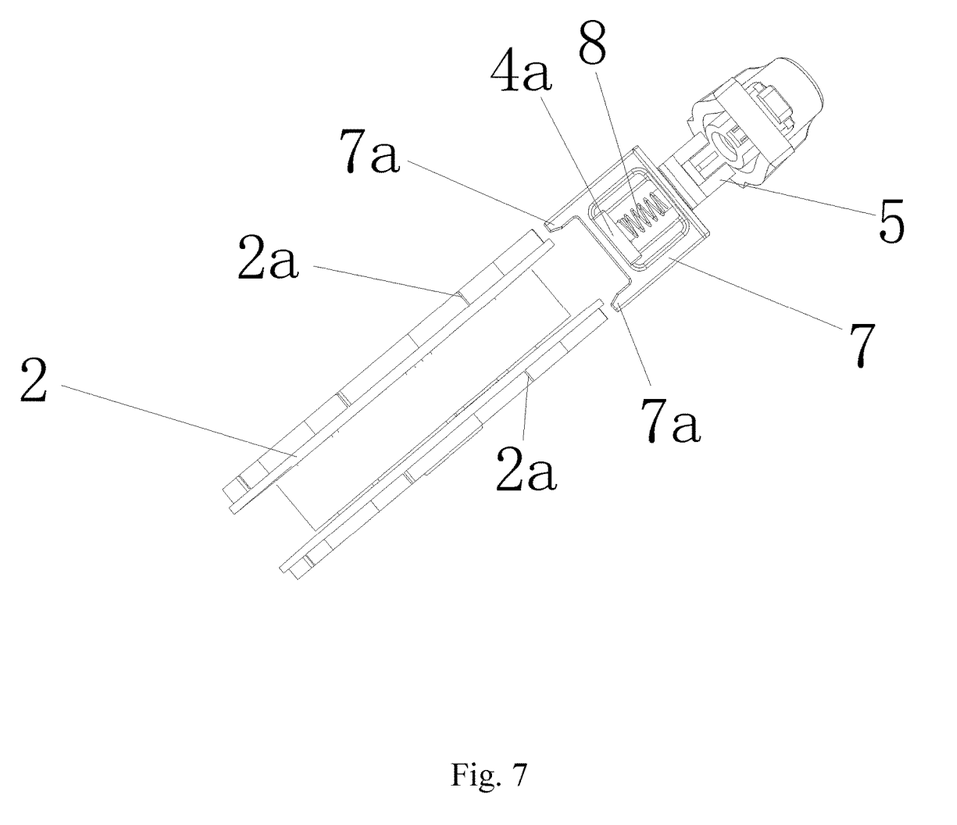
FIG. 7 is a schematic view showing the engagement of the turntable with the tab in this pet tractor of the present invention.

As shown in FIG. 7, in this example, the teeth 2a are distributed symmetrically on both sides of the turntable 2 in the axial direction. The tab 7 has an inner end near the turntable 2 and an outer end away from the turntable 2. The tab 7 is provided at the inner end with two pallets 7a that are spaced in parallel with each other and respectively correspond to the teeth on both sides of the turntable in the axial direction. After the button 5 is pressed, the two pallets 7a move inwardly in the radial direction of the turntable 2 and respectively engage with the teeth 2a on both sides of the turntable, and the turntable 2 is tightly locked circumferentially.

In this example, with a spring seat 4a fixed in the guide sleeve 4, the tab 7 is movably sleeved outside the spring seat 4a and is slidable along the guide hole of the guide sleeve 4. The return spring 8 is fixed at one end to the spring seat 4a and connected at the other end against the tab 7.

Figure 1:
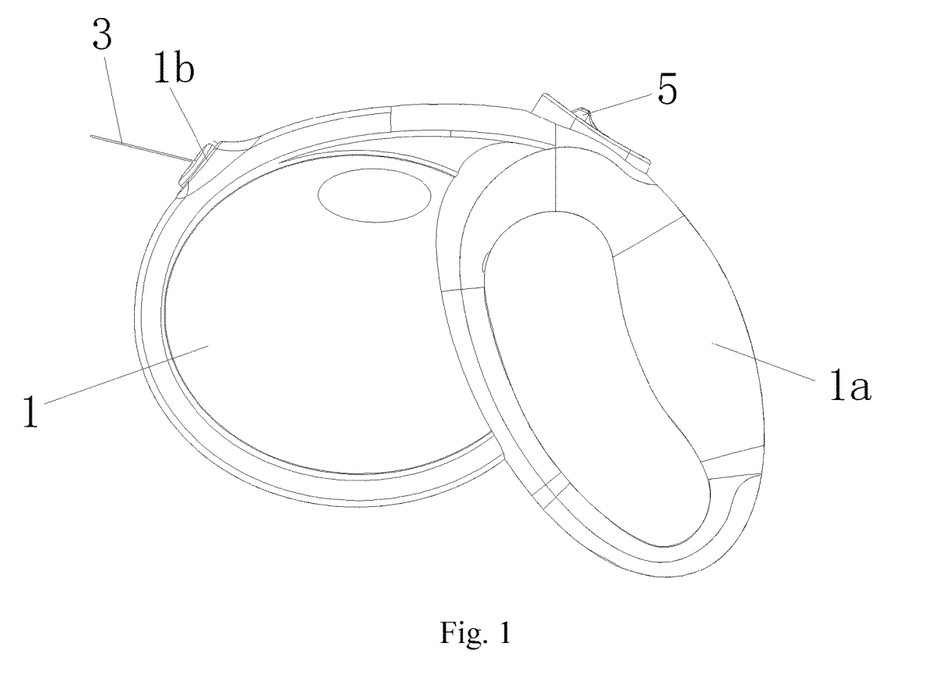
FIG. 1 is a schematic view of the external structure of this pet tractor of the present invention.
Figure 2:
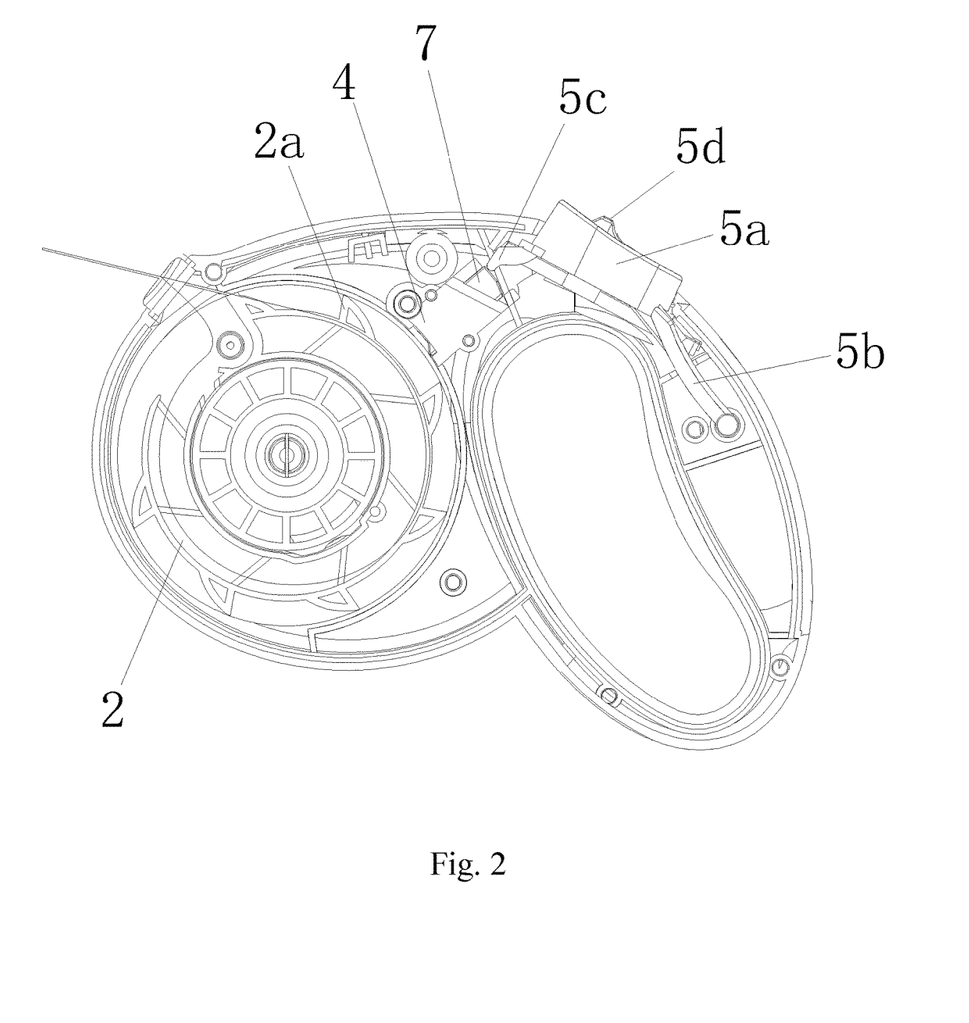
FIG. 2 is one of the schematic views of the internal structure of this pet tractor of the present invention.
Figure 3:
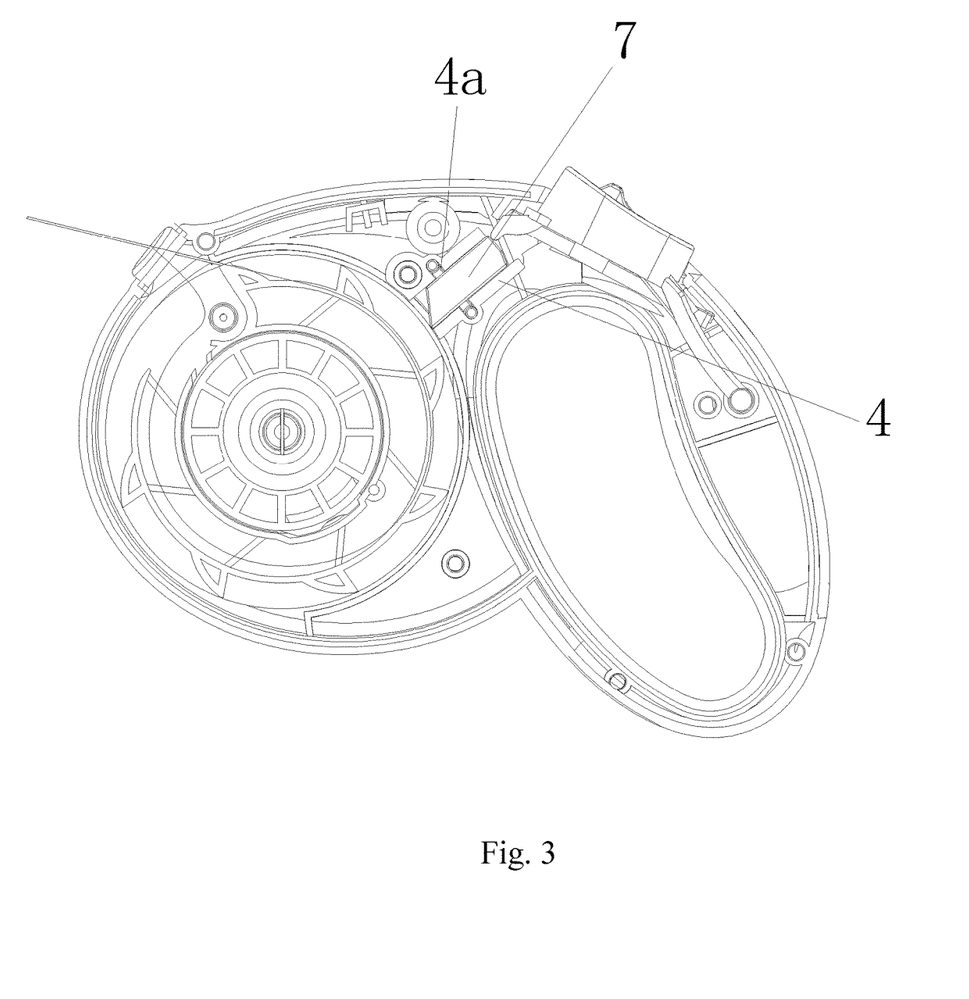
FIG. 3 is another schematic view of the internal structure of this pet tractor of the present invention.
Figure 4:
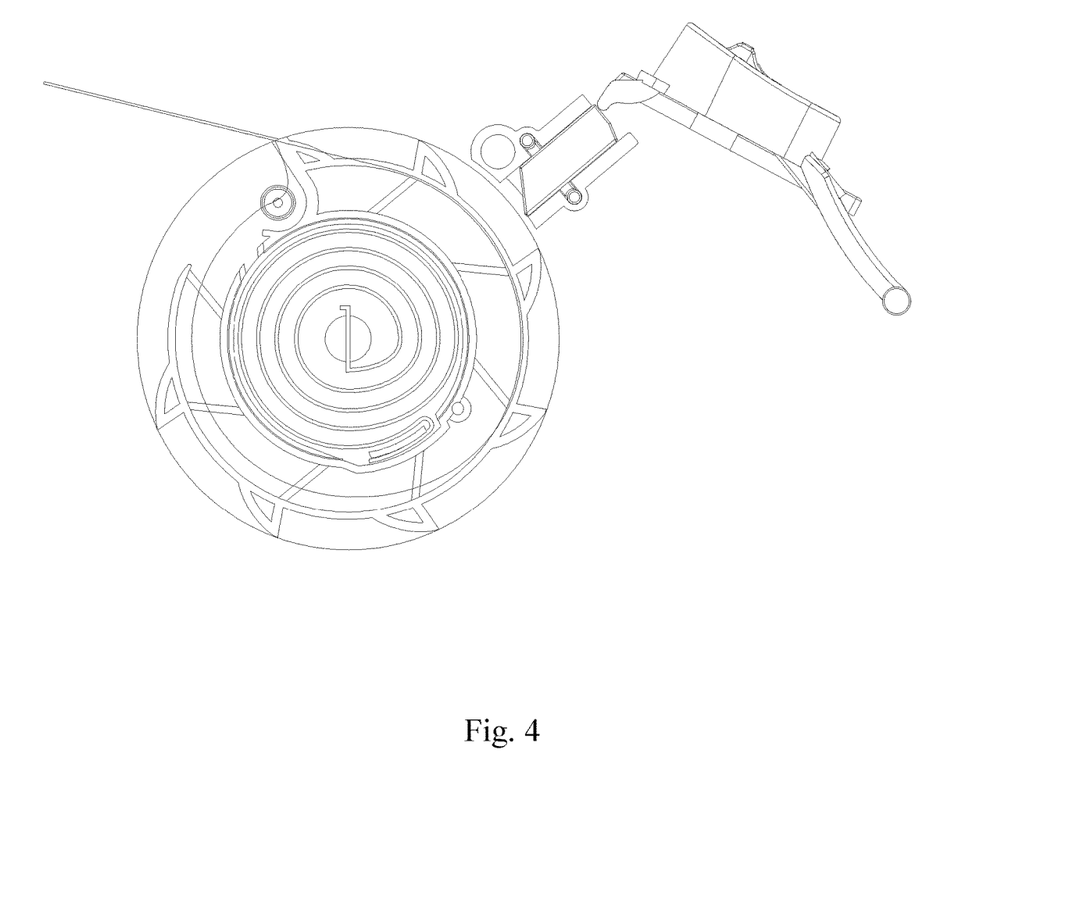
FIG. 4 is a schematic view of a local structure of this pet tractor of the present invention, wherein the housing structure is removed.
Figure 5:
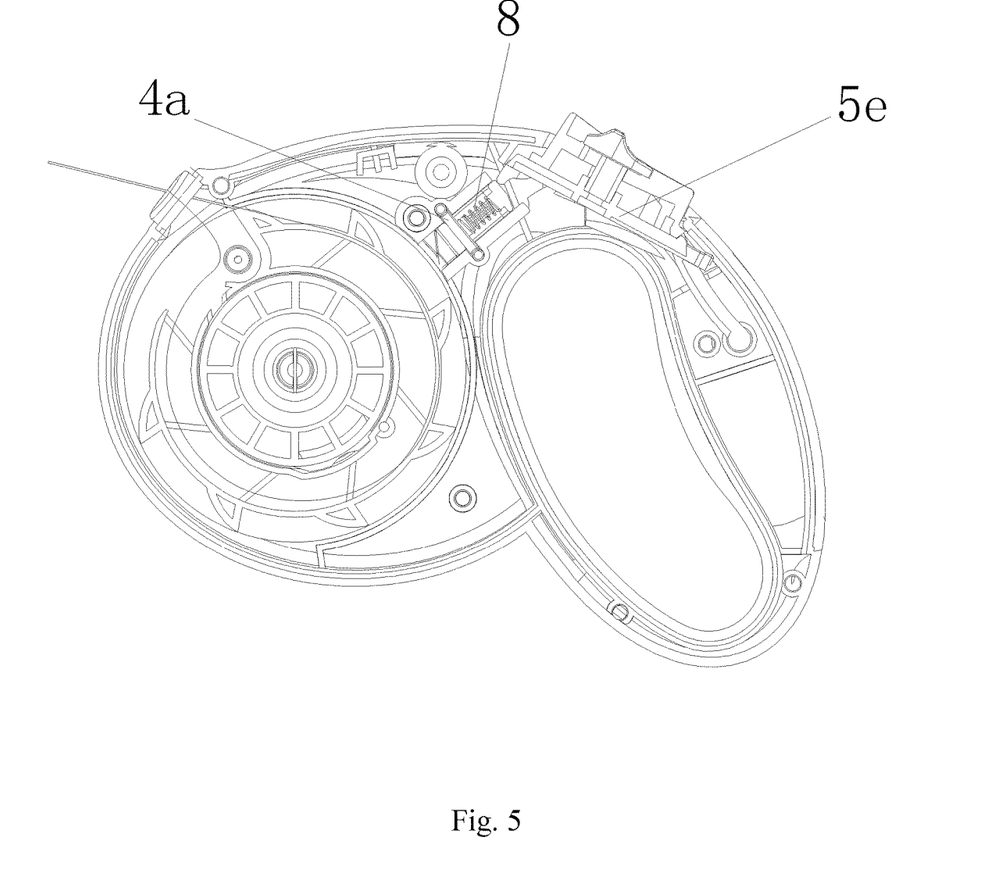
FIG. 5 is still another schematic view of the internal structure of this pet tractor of the present invention, wherein the tab structure is removed.

As shown in FIGS. 2 and 5, the guide sleeve 4 in this example is designed into a split structure comprising a left sleeve casing and a right sleeve casing that snap fit with each other, on whose snap-fitting surfaces are respectively formed two sockets extending inwardly; and two pins, formed respectively at the left and right ends of the spring seat 4a, are inserted into the sockets (as shown in FIGS. 3 and 5 without marked number), that is, the spring seat 4a is fixed in the guide sleeve 4 through a total of four pins on its left and right sides. Not only does this design facilitate the assembly of the guide sleeve, the spring, the spring seat and the tab, but also the spring seat has a guide positioning effect on the snap fitting of the left sleeve casing with the right sleeve casing, which is very ingenious. FIG. 2 shows the left sleeve casing of the guide sleeve 4, and FIGS. 3 and 5 show the right sleeve casing of the guide sleeve 4.

Figure 6:
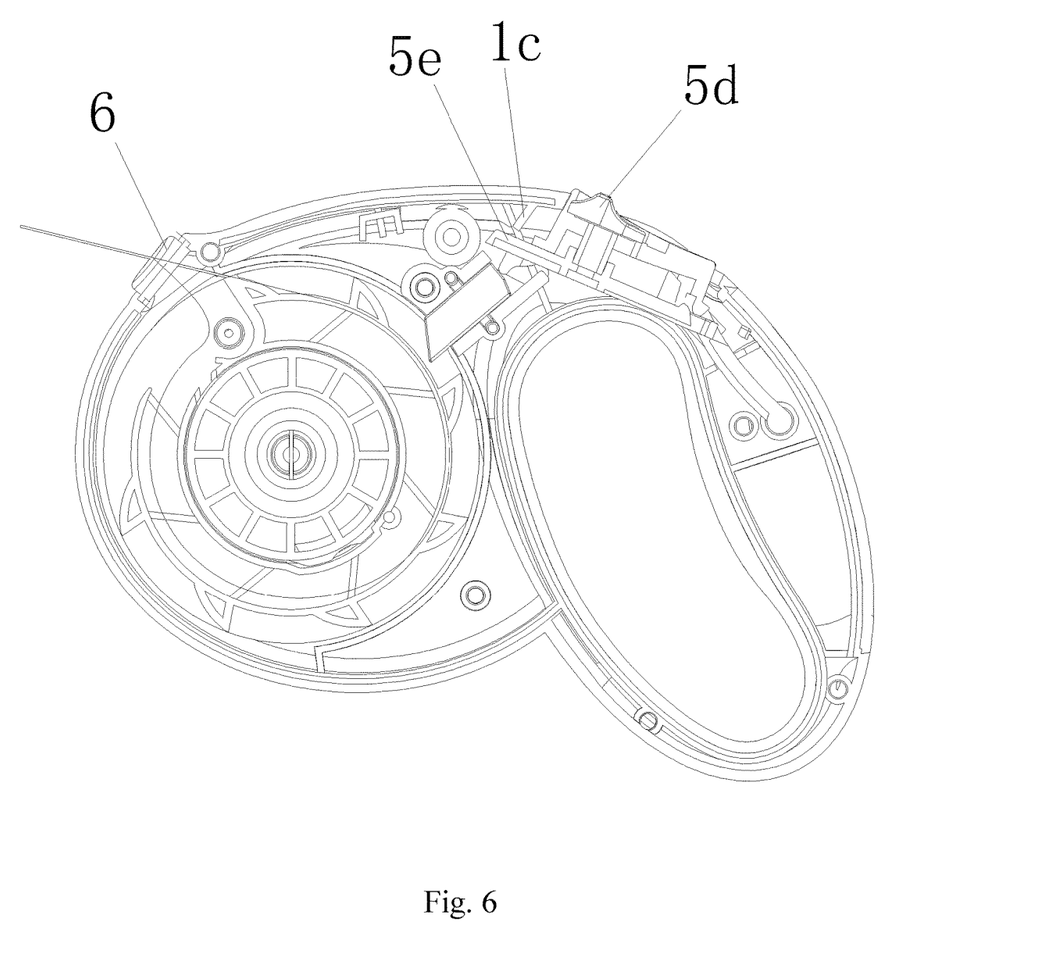
FIG. 6 is a schematic view of the internal structure of this pet tractor of the present invention in a locked state.

In this example, the specific structure of the button 5, as shown in FIGS. 2 and 6, includes a button body 5a partially exposed out of the housing 1, the button body 5a being provided at the rear portion with a hinged end 5b hinged in the housing 1 and at the front portion with a drive end 5c abutting against the outer end of the tab 7.

In a natural state, under the action of the elastic force of the return spring 8, the tab 7 moves outwardly in the radial direction of the turntable 2, extending from the return spring 8 to a free state or a state in which the button 5 abuts against the inner wall of the housing 1. At this time, the pallet 2a at the inner end of the tab 7 is separated from the teeth 2a on the turntable 2, which can then rotate freely. When the button 5 is pressed to make the button body 5a in FIG. 2 move downward, the hinged end 5b at the rear portion of the button 5 rotates counterclockwise around the hinged point in FIG. 2, the drive end 5c at the front portion of the button 5 also rotates counterclockwise in FIG. 2 to abut against the tab 7 to move inwardly in the radial direction of the turntable 2 (at this time the return spring 8 is compressed to become shorter); this then makes the pallet 2a at the inner end of the tab 7 engage with the teeth 2a on the turntable 2, such that the turntable 2 is tightly locked circumferentially and the hauling rope 3 cannot be pulled out. After the button 5 is released, under the action of the elastic force of the return spring 8, the button 5 and the tab 7 return to the initial position, and the pallet 2a at the inner end of the tab 7 is again separated from the teeth 2a on the turntable 2.

In order to extend the service life of the hauling rope 3 and prevent the hauling rope 3 from being worn quickly by the wall of the rope hole, a rubber collar 6 is mounted on the rope hole 3 in this example.

The button body 5a is provided with a limit pusher 5e that can move back and forth and is located inside the housing 1, and a push button 5d that is fixed on this limit pusher and located outside the housing 1. A limit rib 1c in cooperation with the limit pusher 5e is also formed inside the housing 1.

Besides, the button body 5a in this example is also provided with a limit pusher 5e that can move back and forth and is located inside the housing 1, and a push button 5d that is fixed on this limit pusher and located outside the housing 1 (with the push button disposed in the button body, the thumb used for pressing the button can be used directly to push this push button), a limit rib 1c in cooperation with the limit pusher 5e being also formed inside the housing 1. Such arrangement has the following purpose: After the button 5 is pressed to make the turntable 2 fixed, the push button 5d is pushed manually to push the limit pusher 5e to the limit rib 1c in the housing 1, thereby fixing the limit pusher 5e and the limit rib 1c mutually; even if the button 5 is released at this time, it is still fixed in the pressed-down position and will not return under the action of the elastic force of the return spring 8, which makes the tab 7 always engage with the teeth 2a on the turntable 2, and thereby the turntable 2 is locked and the hauling rope 3 cannot be pulled out, as shown in FIG. 6. A user can release the locked state of the turntable simply by pushing the push button in the opposite direction.

In addition, the teeth 2a in this example have a tooth tip portion at the top and a curved guide slope extending downward from this tooth tip portion. Such arrangement has the following advantage: When the button 5 is pressed to make the end of the pallet 7a of the tab 7, while moving downward, get into contact with the tooth tip portion or curved guide slope of the teeth, the pallet 7a will not drag the tooth tip portion or curved guide slope completely to not allow moving down, but will slide over the tooth tip portion or curved guide slope (the turntable in FIG. 2 rotates counterclockwise by a certain angle) and engage with a next tooth. It is thus clear that no matter what a position to which the turntable 2 rotates, it can be guaranteed that the tab 7 will engage with the teeth 4 stably so long as the button 5 is pressed, without the case where the button 5 cannot be pressed and thus get stuck.

Certainly, the above examples are used only for explaining the technical concept and characteristics of the present invention. They are provided to make people understand and implement the present invention, but do not limit the scope of protection of the present invention. Any equivalent alteration or modification made according to the spiritual essence of the primary technical solution of the present invention shall fall within the scope of protection of the present invention.

What is claimed is:

1. A pet tractor, comprising:
    a housing with a handle formed thereon;
    a turntable rotatably disposed in the housing;
    a hauling rope coiled on the turntable, with the housing provided with a rope hole for drawing out the hauling rope, the handle being provided with a button partially exposed out of the housing;
    a guide sleeve, fixed in the housing, provided inside with a guide hole extending along the radial direction of the turntable;
    a tab, in linkage with the button, slidably arranged in the guide hole of the guide sleeve, with a return spring connected between the tab and the guide sleeve; and
    a plurality of circumferentially spaced teeth, engaging with the tab, are formed circumferentially around the turntable;
    wherein in a natural state, under the action of an elastic force of the return spring, the tab is separated from the teeth, and the turntable can rotate freely; after the button is pressed, the tab makes a linkage action to move inwardly along the radial direction of the turntable and engages with the teeth, such that the turntable is locked circumferentially,
    wherein the button includes a button body partially exposed out of the housing, and the button body is provided at the rear portion with a hinged end hinged in the housing and at the front portion with a drive end abutting against the outer end of the tab, and
    wherein when the button is pressed, the hinged end of the button rotates counterclockwise around a hinged point and the drive end rotates counterclockwise to abut against the tab to move inwardly in a radial direction of the turntable.

2. The pet tractor according to claim 1 wherein the teeth are distributed symmetrically on both sides of the turntable in the axial direction; the tab has an inner end near the turntable and an outer end away from the turntable, with the tab provided at the inner end with two pallets that are spaced in parallel with each other and respectively correspond to the teeth on both sides of the turntable in the axial direction.

3. The pet tractor according to claim 2 wherein with a spring seat fixed in the guide sleeve, the tab is movably sleeved outside the spring seat and is slidable along the guide hole of the guide sleeve, and the return spring is fixed at one end to the spring seat and connected at the other end against the tab.

4. The pet tractor according to claim 3 wherein the guide sleeve comprises a left sleeve casing and a right sleeve casing that snap fit with each other.

5. The pet tractor according to claim 1 wherein the rope hole is provided with a rubber collar.

6. The pet tractor according to claim 1 wherein the button body is provided with a limit pusher that can move back and forth and is located inside the housing, and a push button that is fixed on this limit pusher and located outside the housing, a limit rib in cooperation with the limit pusher being also formed inside the housing.

7. The pet tractor according to claim 1 wherein the housing is composed of a left half housing and a right half housing that snap fit with each other.

8. The pet tractor according to claim 1 wherein the teeth have a tooth tip portion at the top and a curved guide slope extending downward from this tooth tip portion.

* * * * *